June 22, 1965     T. R. SANTELLI     3,190,943
METHOD OF PRODUCING CARTON LINERS AND PARTITIONS
Original Filed March 29, 1961     2 Sheets-Sheet 1
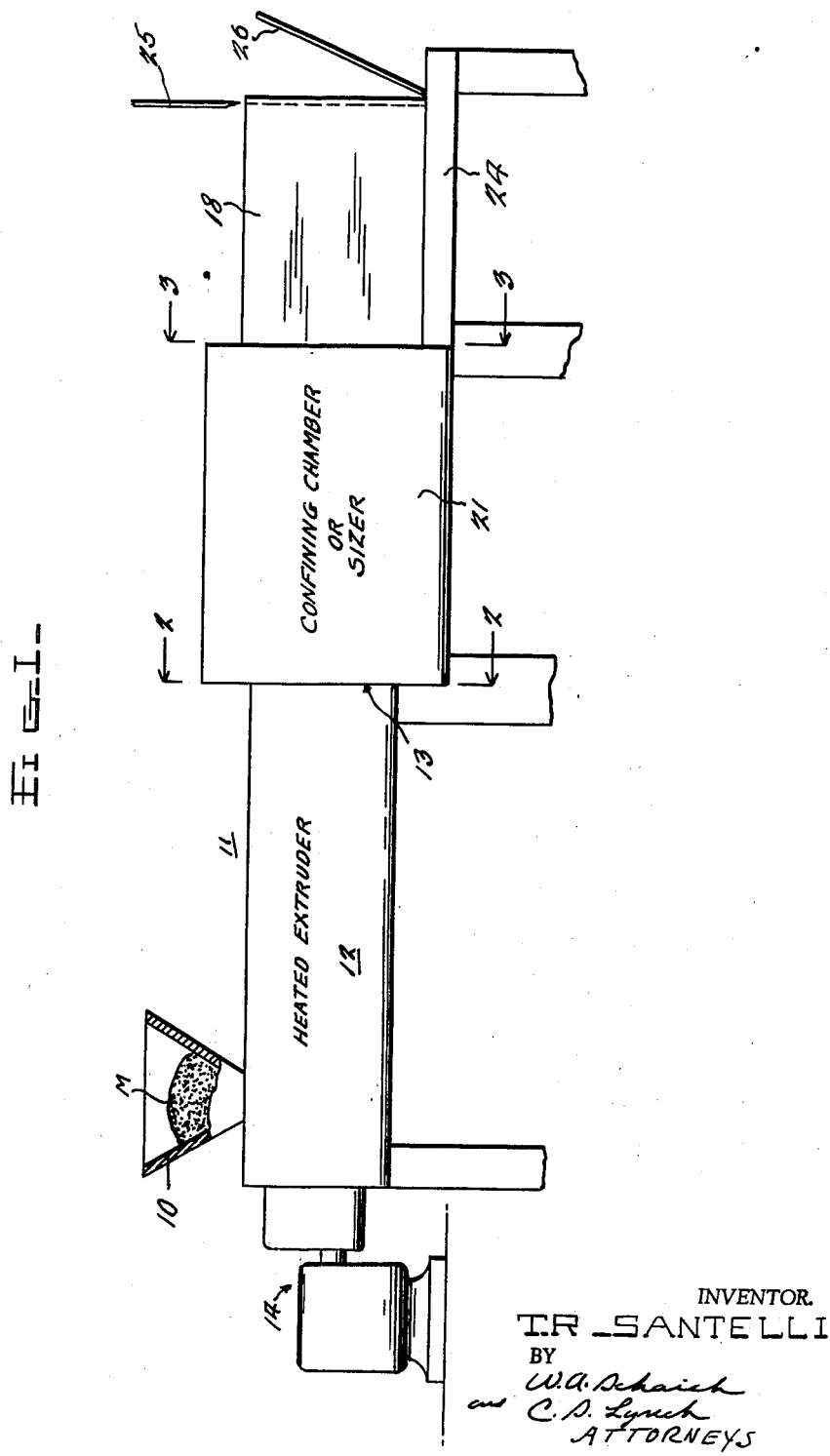
INVENTOR.
T.R. SANTELLI

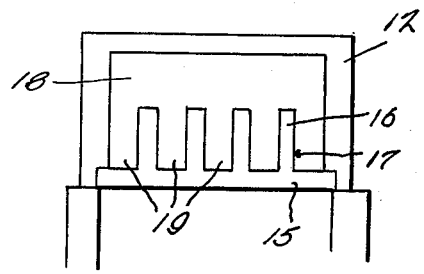
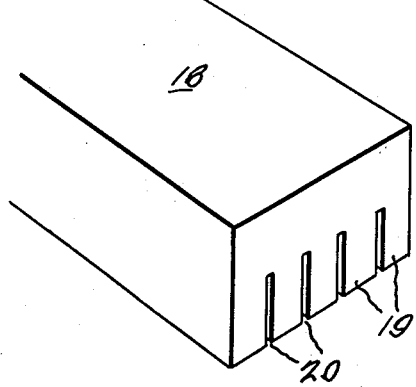
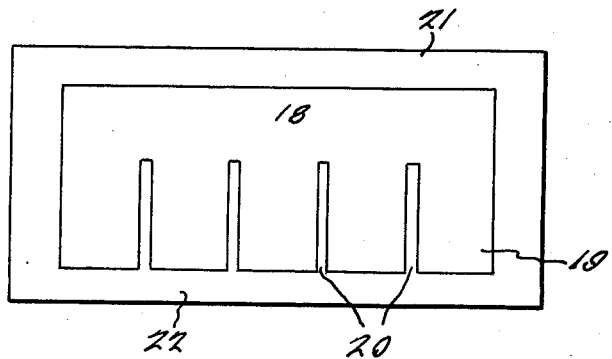
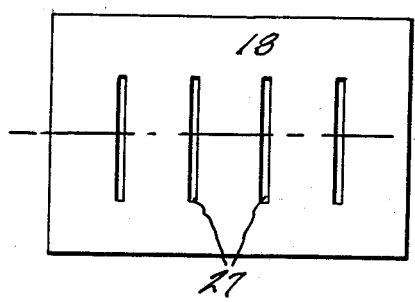
CUTTING LINE

United States Patent Office 3,190,943
Patented June 22, 1965

3,190,943
METHOD OF PRODUCING CARTON LINERS AND PARTITIONS
Thomas R. Santelli, Sylvania, Ohio, assignor to Owens-Illinois Glass Company, a corporation of Ohio
Continuation of application Ser. No. 99,084, Mar. 29, 1961. This application Jan. 16, 1963, Ser. No. 252,548
3 Claims. (Cl. 264—41)

This patent application is a continuation of my co-pending patent application, Serial No. 99,084, filed March 29, 1961, now abandoned.

My invention is a novel method for manufacturing carton liners and partitions, the latter being utilized extensively in providing individual article accommodating cells in shipping cartons.

More particularly, my invention is a simple, effective method capable of high speed operation for forming partitions from an expandable plastic material, such for example, as polystyrene. Partitions formed from such thermoplastic material are extremely light weight, strong, and possess desirable cushioning characteristics.

An object of my invention is the provision of a novel method involving continuous, or if preferred, intermittent, extrusion of a mass of expandable polystyrene in more or less block form, requiring only cutting or slicing of the block into strips of the desired thickness, to produce finished, notched or slotted, ready-to-use partitions.

Other objects will be in part apparent and in part pointed out hereinafter.

In the accompanying drawings forming a part of my application:

FIG. 1 is a schematic side elevational view of apparatus capable of practicing my method.

FIG. 2 is a view taken along the plane of line 2—2 of FIG. 1 showing the initial form of the extruded block, just prior to expansion.

FIG. 3 is a view taken along the plane of line 3—3 of FIG. 1 showing the finally expanded extruded block, just prior to being cut transversely into partition strips of the desired thickness.

FIG. 4 is a perspective view of an extruded block ready to be cut into finished slotted or notched partition strips.

FIG. 5 is an end view of another form of extruded block which may be cut longitudinally horizontally into two sections which thereafter will be sliced transversely to produce the individual slotted partition strips.

My invention may well utilize, as the molding material, a polystyrene plastic known as "Dylite" which is in the form of beads and manufactured by the Koppers Company, Inc. These beads are expandable by heating in a temperature range of about 180–240° F. until a density of, say, 2–5 lbs. per cubic foot is obtained. Such beads contain a volatile liquid, e.g. pentane, as an expanding agent. Although a polymer of styrene is preferred, any plastic material containing a volatile liquid, or one of the solid chemical expansion agents which decompose on heating to yield a gaseous expansion agent, can be employed. It is also possible to introduce into an extruder along with the molding material, as a separate component, an expanding agent. With the application of heat the expanding agent decomposes and produces a gaseous agent which, upon exposure to the atmosphere at the discharge end of the extruder, converts the styrene into a cellular form.

Carton liners and partition strips with which my invention is concerned are relatively thin sheets, the partitions generally being notched, or slotted, along one margin so that several such strips may be interlocked to provide the customary article (bottle or jar) accommodating cells. These cells may be preassembled and dropped into shipping cartons. The foregoing is standard procedure.

My invention is a novel high speed method for use in the manufacture of these liners and partition strips from a molding material, as explained above. According to my method the molding material M is deposited in the hopper 10 of a conventional, or any preferred form of extruder 11, such having a heated plasticizing cylinder 12 and internally, a typical feed screw (not shown) which works the material and advances it in plasticized condition to the exit end 13. A motor 14 may serve to rotate the screw. At the exit end of the extruder is a vertical slotted die 15 (FIG. 2) including a transverse row of alternating upstanding fingers 16 and vertical slots 17. This die may be mounted in the extruder in any well known or preferred fashion. The plastic material under pressure of the screw, or other moving means is forced through the slotted die, being discharged as a slotted, rectangular block 18.

Immediately upon making its exit from the die 15 of the extruder the material inherently expands to some appreciable extent in all directions. Since, as is evident, such expansion effects enlargement of the fingers 19 in all directions and a corresponding decrease in the width of the slots 20 therebetween, these being elements of the finished partition strip, it is, of course, essential that the die 15 be sufficiently smaller than the finished partition strip so that when expanded, the strip will be properly dimensioned.

Immediately adjacent to the extruder die 15 is an artificially cooled confining chamber 21 into which the extruded, partially formed, plastic moves at about the moment it begins to expand. This chamber 21 may embody a die 22 (FIG. 3) of slightly different proportions than the die 15 in the extruder, to the end that it will limit expansion of the extruded material and set same, preparatory to cutting, or slicing, into partition strips or liner sheets, as the case may be, which are ready to use, without any further trimming or finishing.

In FIG. 4 I have shown a fragment of an extruded block 18 incorporating the fingers 19 and intermediate slots 20, such also being shown at the right-hand side of FIG. 1 upon a cutting table 24 beneath a vertically reciprocable cutter 25. A severed ready-to-use partition strip 25 is shown in dotted lines in FIG. 1.

As indicated in FIG. 5, the extruder and die may be formed to produce a mass of twice the cross-sectional area of the form shown in FIG. 2 and with a plurality of longitudinal vertical parallel channels 27, in lieu of the open-ended slots, or notches. Such a block may then be cut longitudinally along a medial horizontal plane and the resultant two blocks sliced vertically as previously described. Alternatively, the block, as extruded, could initially be sliced, or cut, vertically into double size partition, or liner sheets and then each such partition or liner sheet cut in half.

Obviously, the shape of the notches or slots in the partition strips may be varied. Other modifications may be resorted to within the spirit and scope of the appended claims. For example, the plastic may be molded, as distinguished from extruded, into block form, removed from its mold and then sliced into strips of the desired thickness.

I claim:

1. The method of producing slot-containing partitions suitable for interlocking with one another to provide article-accommodating cells in shipping cartons which consists of:

(1) extruding a plastic as an elongated mass having longitudinal slots rectangular in cross section with the dimensions of each slot being approximately the dimensions of a slot in a conventional partition and with the general contour of the extruded mass in a plane normal to the direction of extrusion being approximately that of the general peripheral contour of a conventional slotted partition, and
(2) severing the cooled mass only at parallel planes normal to the direction of extrusion with each plane spaced from adjacent parallel planes by a distance approximately equal to the width of the slot to produce slot-containing partitions suitable for interlocking with one another to provide article-accommodating cells in shipping cartons.

2. The method of producing slot-containing partitions suitable for interlocking with one another to provide article-accommodating cells in shipping cartons which consists of:
(1) extruding an expandable plastic as an elongated mass having at least one rectangular hole defined on at least three sides by plastic extending the length of the elongation of the mass with the width of the hole being approximately equal to the width of a conventional slot in a corrugated slotted partition and with the other dimension of the rectangular hole being approximately equal to an integer of the depth of a slot of a conventional slotted partition with a maximum integer of 2 and with the general contour of the extruded mass in a plane normal to the direction of extrusion being rectangular,
(2) passing the mass through confining and cooling means which restricts expansion of the mass as regards its outer dimensions but allows a predetermined amount of internal expansion of the plastic mass to decrease the width and depth dimensions of the rectangular longitudinally extending hole, and
(3) severing the cooled mass only at parallel planes normal to the direction of extrusion with each plane spaced from adjacent parallel planes by a distance approximately equal to the width of the hole to produce slot-containing partitions, with at most only one additional cut of the sheet in a plane parallel to the direction of extrusion and parallel to the width of the hole, to produce slot-containing partitions suitable for interlocking with one another to provide article-accommodating cells in shipping cartons, said additional cut being made only if said at least one rectangular hole is defined on four sides by plastic and being made at plane between and parallel to the sides of said rectangle having the shorter length.

3. The method of claim 2 wherein the expandable plastic is polystyrene.

References Cited by the Examiner

UNITED STATES PATENTS

| | | | |
|---|---|---|---|
| 287,699 | 10/83 | Meeker | 264—146 XR |
| 1,973,092 | 9/34 | Mooney | 264—148 XR |
| 1,986,759 | 1/35 | Kaufman. | |
| 2,209,643 | 7/40 | Chamblin | 264—152 XR |
| 2,740,157 | 4/56 | McCurdy et al. | 264—53 |
| 2,905,972 | 9/59 | Aykanian et al. | 264—53 |
| 3,067,903 | 12/62 | Jones | 220—22 |

FOREIGN PATENTS

| | | |
|---|---|---|
| 1,223,502 | 6/60 | France. |
| 345,586 | 5/60 | Switzerland. |

OTHER REFERENCES

"Dylite Expandable Polystyrene," Koppers booklet, all pages, 1959.

ALEXANDER H. BRODMERKEL, *Primary Examiner.*
ROBERT F. WHITE, *Examiner.*